United States Patent Office.

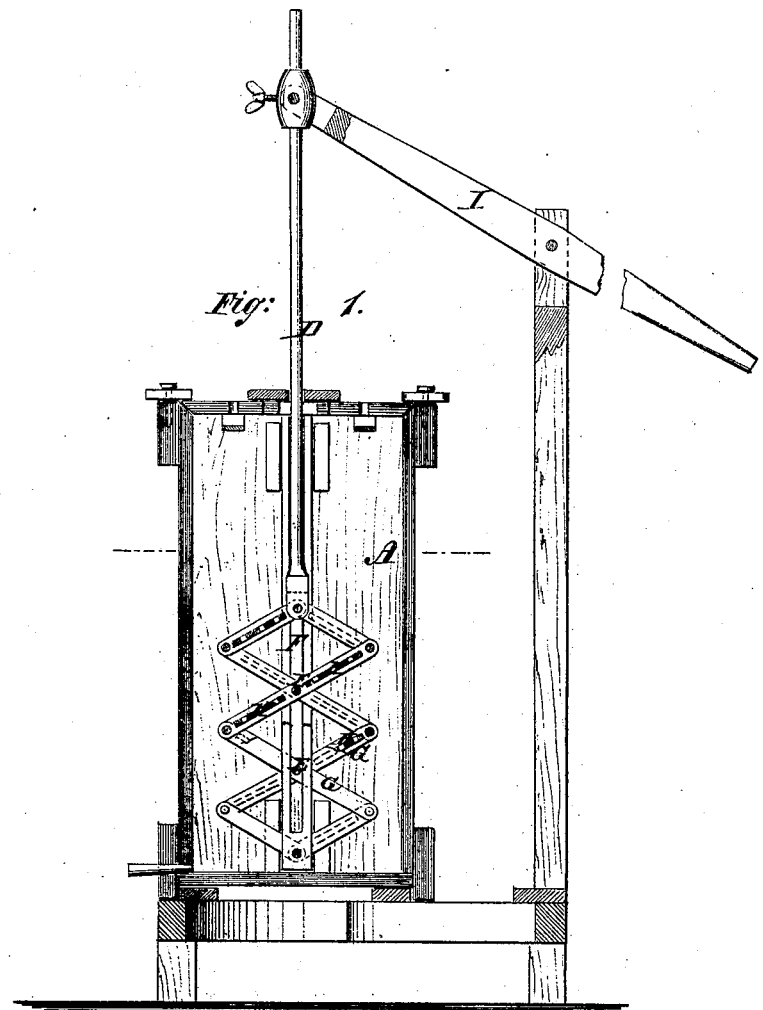

JOHN W. JORDAN, OF LEXINGTON, VIRGINIA.

Letters Patent No. 110,047, dated December 13, 1870.

IMPROVEMENT IN CHURNS.

The Schedule referred to in these Letters Patent and making part of the same.

*To all whom it may concern:*

Be it known that I, JOHN W. JORDAN, of Lexington, in the county of Rockbridge and State of Virginia, have invented a new and useful Improvement in Churns; and I do hereby declare that the following is a full, clear, and exact description thereof, which will enable others skilled in the art to make and use the same, reference being had to the accompanying drawing forming part of this specification.

This invention relates to improvements in churns, and consists in a vertically-moving dasher composed of one or more lazy-tongs frames, jointed at one end to the bottom of the churn-case, and to the upper end to a vertically-reciprocating rod, worked by a lever or otherwise, so as to expand and contract the said frames, which have perforated boards so attached as to move up and down in the cream in a way to cause intense agitation.

Figure 1 is a vertical sectional elevation of my improved churn, and

Figure 2 is a horizontal section of the same.

Similar letters of reference indicate corresponding parts.

A represents a vertical rectangular case, in which two or more lazy-tongs frames, B, are placed vertically and jointed to the case at the bottom, as shown at C, and at the top to the connecting or working-rod D.

The center pivots E project into guide-grooves F in the sides of the case, and the bars G support perforated boards H between them, to be worked vertically through the cream for agitating it.

The working-rod may be connected to a hand-lever, I, for working it, or it may have other means for the purpose applied to it.

Narrow bars may be used instead of the perforated boards, and the guide-grooves may be dispensed with, if preferred.

It will be seen that this improved dasher will produce very intense agitation.

Having thus described my invention,

I claim as new and desire to secure by Letters Patent—

A churn-dasher, consisting of the lazy-tongs frames B, provided with the perforated boards and connected to the case and working-rod, substantially as specified.

JOHN W. JORDAN.

Witnesses:
JAS. COMPTON,
J. J. WATSON.